United States Patent
Downs et al.

(10) Patent No.: US 8,047,323 B2
(45) Date of Patent: Nov. 1, 2011

(54) MOTOR VEHICLE WITH DISCONNECTABLE ALL-WHEEL DRIVE SYSTEM

(75) Inventors: James P Downs, South Lyon, MI (US); Gregory A Marsh, Ferndale, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 627 days.

(21) Appl. No.: 12/191,699

(22) Filed: Aug. 14, 2008

(65) Prior Publication Data

US 2010/0038164 A1    Feb. 18, 2010

(51) Int. Cl.
*B60K 17/344* (2006.01)
(52) U.S. Cl. ........................................................ 180/247
(58) Field of Classification Search ................... 180/233, 180/247
See application file for complete search history.

(56) References Cited

U.S. PATENT DOCUMENTS

| | | | |
|---|---|---|---|
| 4,915,190 A | 4/1990 | Iwata | |
| 5,105,901 A | 4/1992 | Watanabe et al. | |
| 5,105,902 A | 4/1992 | Wilson et al. | |
| 5,411,110 A | 5/1995 | Wilson et al. | |
| 5,562,566 A * | 10/1996 | Yang | 477/3 |
| 5,951,428 A | 9/1999 | Itoh et al. | |
| 6,113,512 A | 9/2000 | Williams | |
| 6,263,995 B1 | 7/2001 | Watson et al. | |
| 6,805,653 B2 | 10/2004 | Krzesicki et al. | |
| 6,814,682 B2 | 11/2004 | Spitale | |
| 6,974,400 B2 | 12/2005 | Williams | |
| 7,150,694 B2 | 12/2006 | Mizon et al. | |
| 7,331,896 B1 | 2/2008 | Kroppe | |
| 7,533,754 B2 * | 5/2009 | Burrows et al. | 180/248 |
| 2005/0023063 A1 | 2/2005 | Mueller | |
| 2006/0283654 A1 | 12/2006 | Krisher | |

FOREIGN PATENT DOCUMENTS

| | | |
|---|---|---|
| KR | 2019990020807 U | 6/1999 |
| KR | 100274035 B1 | 12/2000 |
| KR | 100483163 B1 | 4/2005 |

OTHER PUBLICATIONS

International Search Report and Written Opinion for International Application No. PCT/US2009/053514, dated Mar. 29, 2010.

* cited by examiner

*Primary Examiner* — Kevin Hurley
(74) *Attorney, Agent, or Firm* — Harness, Dickey & Pierce, P.L.C.

(57) ABSTRACT

A vehicle with primary and secondary drivelines and a power take-off unit (PTU). The primary driveline has a first differential that is configured to distribute power to a first set of wheels. The PTU has a PTU input, a PTU output and a synchronizer for selectively de-coupling the PTU output from the PTU input. The secondary driveline is configured to distribute power to a second set of wheels and has a propshaft, a second differential, a pair of half-shafts and at least one torque transfer device (TTD). The propshaft transmits rotary power between the PTU output and an input of the second differential. The half-shafts are rotatably coupled to an output of the second differential and are configured to transmit rotary power to the second set of wheels. The at least one TTD is configured to selectively inhibit torque transmission through the second differential to the second set of wheels.

18 Claims, 5 Drawing Sheets

MOTOR VEHICLE WITH DISCONNECTABLE ALL-WHEEL DRIVE SYSTEM

The present invention generally relates to vehicle drivelines and more particularly to a vehicle driveline with a disconnectable all-wheel drive system.

Many modern automotive vehicles, such as crossover vehicles, are available with an all-wheel drive (AWD) driveline that is based on a front-wheel drive (FWD) architecture. Unfortunately, such AWD drivelines typically include components, such as the output of a power take-off, that are rotatably driven even when the driveline is operated in a mode in which power is not transmitted through such components. Consequently, such AWD drivelines can be less fuel efficient (according to standards established by the U.S. Environmental Protection Agency) than similar FWD drivelines by one or two miles per gallon.

Accordingly, there remains a need in the art for an improved AWD driveline.

SUMMARY

In one form, the present teachings provide a vehicle with primary and secondary drivelines and a power take-off unit (PTU). The primary driveline has a first differential that is configured to distribute power to a first set of wheels. The PTU has a PTU input, a PTU output and a synchronizer for selectively de-coupling the PTU output from the PTU input. The secondary driveline is configured to distribute power to a second set of wheels and has a propshaft, a second differential, a pair of half-shafts and at least one torque transfer device (TTD). The propshaft transmits rotary power between the PTU output and an input of the second differential. The half-shafts are rotatably coupled to an output of the second differential and are configured to transmit rotary power to the second set of wheels. The at least one TTD is configured to selectively inhibit torque transmission through the second differential to the second set of wheels.

In another form the teachings of the present disclosure provide a vehicle with a primary driveline, a power take-off unit (PTU) and a secondary driveline. The primary driveline has a first differential that is configured to distribute power to a first set of vehicle wheels. The PTU has a PTU input, a PTU output, a shift collar, an input gear, a driven gear, a first bevel gear and a second bevel gear. The PTU output is disposed perpendicular to the PTU input. The shift collar is non-rotatably but axially-slidably coupled to the PTU input. The input gear is rotatably mounted on the PTU input. The driven gear is non-rotatably coupled to the first bevel gear and meshingly engaged to the input gear. The second bevel gear is coupled for rotation with the PTU output and meshingly engaged to the first bevel gear. The shift collar is movable between a first position, in which the input gear is not coupled for rotation with the PTU input, and a second position in which the input gear is coupled for rotation with the PTU input. The secondary driveline is configured to distribute power to a second set of vehicle wheels. The secondary driveline has a propshaft, a second differential, a pair of half-shafts and at least one torque transfer device. The propshaft transmits rotary power between the PTU output and an input of the second differential. The half-shafts are rotatably coupled to an output of the second differential and configured to transmit rotary power to the second set of vehicle wheels. The at least one torque transfer device is configured to selectively inhibit torque transmission through the second differential to the second set of vehicle wheels.

Further areas of applicability will become apparent from the description provided herein. It should be understood that the description and specific examples are intended for purposes of illustration only and are not intended to limit the scope of the present disclosure, its application and/or uses in any way.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

DETAILED DESCRIPTION OF THE VARIOUS EMBODIMENTS

Figure 1:
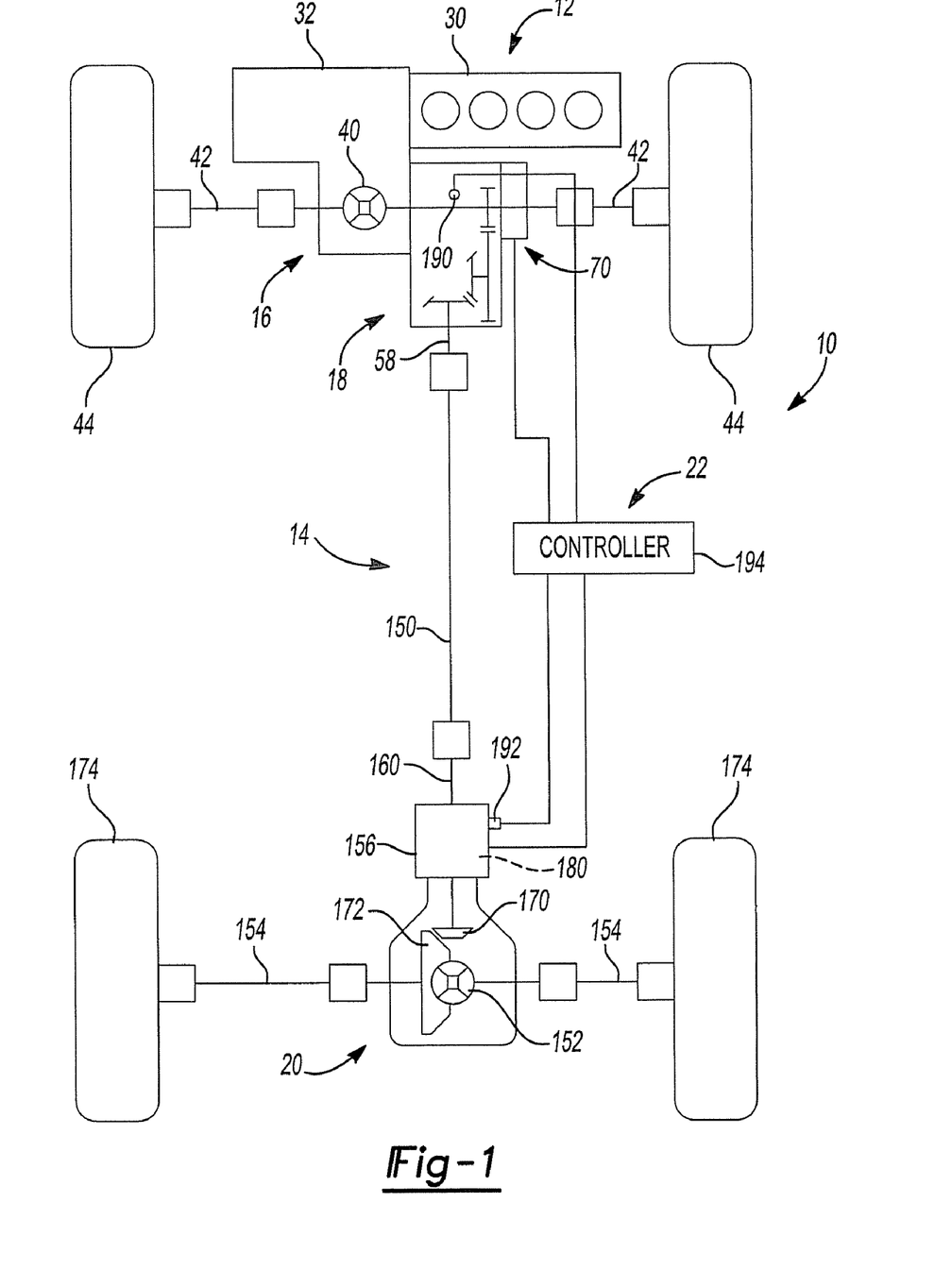
FIG. 1 is a schematic illustration of a vehicle constructed in accordance with the teachings of the present disclosure.

With reference to FIG. 1 of the drawings, a vehicle constructed in accordance with the teachings of the present invention is generally indicated by reference numeral 10. The vehicle 10 can include a powertrain 12 and a drivetrain 14 that can include a primary driveline 16, a power take-off unit (PTU) 18, a secondary driveline 20 and a control system 22.

The powertrain 12 can include a prime mover 30, such as an internal combustion engine or an electric motor, and a transmission 32, which can be any type of transmission, such as a manual, automatic or continuously variable transmission. The prime mover 30 can provide rotary power to the transmission 32, which can output rotary power to the primary driveline 16 and the PTU 18.

The primary driveline 16 can include a first differential 40, which can be driven by the transmission 32, and a pair of first half-shafts 42 that can couple an output (not specifically shown) of the first differential 40 to a first set of vehicle wheels 44.

Figure 2:
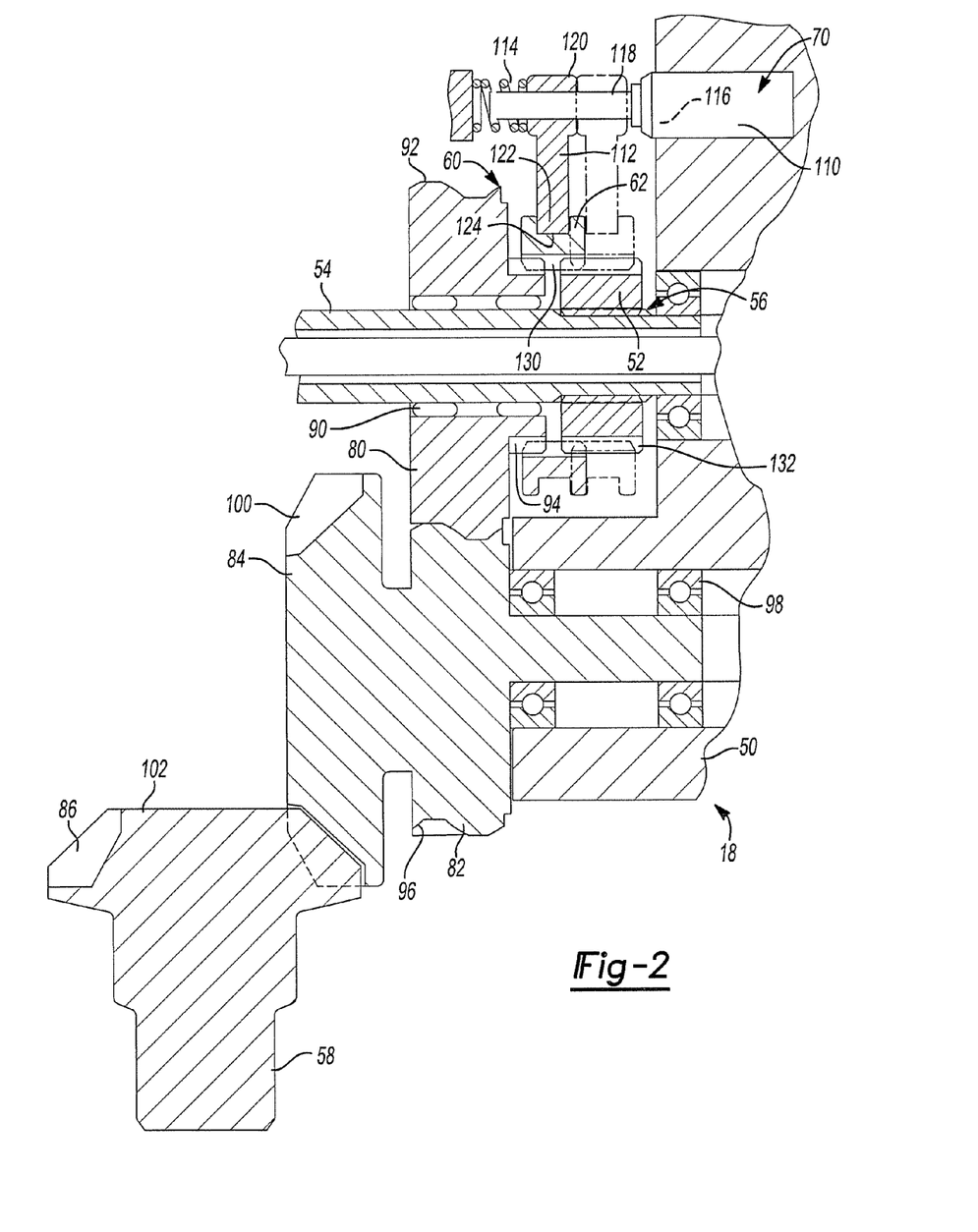
FIG. 2 is a section view of a portion of the vehicle of FIG. 1, illustrating a portion of the power take-off unit in more detail.

With additional reference to FIG. 2, the PTU 18 can include a housing 50, an input 52, which can be housed in the housing 50 and coupled for rotation with an output 54 of the transmission 32 (e.g., via a set of mating spline teeth 56), an output 58, which can be rotatably supported on a set of bearings (not shown) that are received in the housing 50, and a synchronizer 60. The synchronizer 60 can include an axially movable member 62 that can be moved between a first position (shown in phantom line in FIG. 2), in which the output 58 is not driven by the input 52, and a second position (shown in solid line in FIG. 2) in which the output 58 is driven by the input 52. The synchronizer 60 can also include an actuator, such as a linear actuator 70 for moving the axially movable member 62 from the first position to the second position, from the second position to the first position, or both.

In the example provided, the synchronizer 60 further includes an input gear 80, a driven gear 82, a first bevel gear 84 and a second bevel gear 86. The input gear 80 can be disposed coaxially on the output 54 of the transmission 32 on a set of bearings 90 and can include a plurality of gear teeth 92 and a plurality of first coupling teeth 94. The driven gear 82 can include a plurality of gear teeth 96, which can be in meshing engagement with the gear teeth 92 of the input gear 80, and can be supported via a set of bearings 98 for rotation in the housing 50. The first bevel gear 84 can be coupled for rotation with the driven gear 82 (e.g., the driven gear 82 and the first bevel gear 84 can be integrally formed as is shown in the example provided) and can include a first set of bevel gear teeth 100. The second bevel gear 86 can include a second set of bevel gear teeth 102 that can be meshingly engaged to the first set of bevel gear teeth 100. The output 58 can be coupled for rotation with the second bevel gear 86 (e.g., the second bevel gear 86 and the output 58 can be integrally formed as is shown in the example provided).

The linear actuator 70 can be any type of linear actuator and can be electrically, mechanically, hydraulically and/or pneumatically operated. In the particular example provided, the linear actuator 70 includes a solenoid 110, a shift fork 112 and a biasing spring 114. The solenoid 110 can be coupled to the housing 50 and can conventionally include a coil 116 and a plunger 118. The coil 116 can be selectively energized by the control system 22 to generate a magnetic field that can cause the plunger 118 to move from a first position (shown in phantom line in FIG. 2) to a second position (shown in solid line in FIG. 2). The shift fork 112 can include an arm 120, which can be fixedly coupled to the plunger 118, and a generally C-shaped yoke 122 that can be disposed in (and extend around a portion of the circumference of) a groove 124 that is formed about the axially movable member 62. The biasing spring 114 can be disposed between the housing 50 and the arm 120 of the shift fork 112 and can apply a force to the shift fork 112 to bias the plunger 118 toward the first position. In the particular example provided, the axially movable member 62 includes a plurality of internal teeth 130 that are meshingly engaged and slidably disposed on corresponding second coupling teeth 132 formed on the outer peripheral surface of the input 52.

When the coil 116 is energized to cause the plunger 118 to move from the first position to the second position, the shift fork 112 will move axially by a corresponding amount, causing the axially movable member 62 to slide along the second coupling teeth 132 and into engagement with the first coupling teeth 94 that are formed on the input gear 80 to thereby rotatably couple the input gear 80 with the input 52 so that drive torque may be transmitted therebetween. When the coil 116 is de-energized, the biasing spring 114 will urge the plunger 118 toward the second position and cause the shift fork 112 (and the axially movable member 62) to move axially by a corresponding amount. The axially movable member 62 will slide on the second coupling teeth 132 and will disengage the first coupling teeth 94 to thereby rotatably de-couple the input gear 80 from the input 52 so that drive torque may not be transmitted therebetween.

While the linear actuator 70 has been illustrated as including a solenoid 110 and a shift fork 112, those of ordinary skill in the art will be appreciated that various other types of devices can be employed, including ball or lead screws and pressure cylinders. Also, those of ordinary skill will appreciate that while the biasing spring 114 is configured to generate a biasing force that tends to decouple the axially movable member 62 from the input gear 80 so that the vehicle 10 is normally operated in a two-wheel drive mode (e.g., front wheel drive mode), the biasing spring 114 could be located so as to generate a biasing force that tends to couple the axially movable member 62 to the input gear 80 so that the vehicle 10 is normally operated in an all-wheel drive mode.

The secondary driveline 20 can include a propshaft 150, a second differential 152, a pair of second half-shafts 154 and at least one torque transfer device 156. A first end of the propshaft 150 can be coupled for rotation with the output 58 of the PTU 18, while a second end of the propshaft 150 can be coupled for rotation with an input 160 of the torque transfer device 156. The torque transfer device 156 can be employed to selectively transmit rotary power to an input pinion 170. Power received by the input pinion 170 is transmitted through a ring gear 172 to the second differential 152 and output from the second differential to the second half-shafts 154 to thereby couple the second differential 152 to a second set of vehicle wheels 174.

In the particular example provided, the at least one torque transfer device 156 includes a clutch 180, such as a conventional electrically-controlled friction clutch, that is disposed between the second end of the propshaft 150 and the input pinion 170 of the second differential 152. The clutch 180 can be controlled by the control system 22 to operate in a first mode, in which the second end of the propshaft 150 is rotatably de-coupled from the input pinion 170 of the second differential 152, and a second mode in which the second end of the propshaft 150 is rotatably coupled to the input pinion 170 of the second differential 152.

The control system 22 can include a first sensor 190, a second sensor 192 and a controller 194. The first sensor can be configured to sense a rotational speed of a component associated with the primary driveline 16, such as the output 54 (FIG. 2) of the transmission 32, and to responsively generate a first sensor signal in response thereto. The second sensor can be configured to sense a rotational speed of a component associated with the secondary driveline 20, such as the input 160 of the torque transfer device 156, and to responsively generate a second sensor signal in response thereto. The controller 194 can control operation of the at least one torque transfer device 156 based in part on the first and second sensor signals.

In operation, the vehicle 10 is normally operated in a two-wheel drive mode (e.g., front wheel drive mode) in which the output 58 of the PTU 18 is de-coupled from the input 52 of the PTU 18 so that substantially all of the rotary power provided from the powertrain 12 is transmitted to the first differential 40. It will be appreciated that when the vehicle 10 is operated in this mode, only the axially movable member 62 of the PTU 18 will be driven by the transmission 32. Consequently, the vehicle 10 will experience only minor losses relative to a conventional two-wheel drive vehicle (not shown) due to the additional mass of the PTU 18 and the secondary driveline 20, as well as from the rotation of the second half-shafts 154 and the second differential 152.

When all-wheel drive is desired, the control system 22 can be activated via a suitable input, which can include a manual (driver requested) input and/or an input generated by the controller 194 in response to the detection of a predetermined event (e.g., slipping of the first set of vehicle wheels 44). The controller 194 can transmit a signal to the linear actuator 70 to energize the coil 116 to cause the axially movable member 62 to be moved into engagement with the first coupling teeth 94 to thereby rotatably couple the input gear 80 to the input 52 of the PTU 18. The controller 194 can evaluate the first and second sensor signals to determine whether the rotational speed of a component associated with the secondary driveline 20 (i.e., the input 160 of the torque transfer device 156 in the example provided) is rotating at a speed that is equal to or within a predetermined tolerance of the rotational speed of the component associated with the primary driveline 16 (i.e., the output of the transmission 32 in the example provided). The controller 194 can selectively activate the torque transfer device 156 to transmit rotary power to the second set of vehicle wheels 174a when the rotational speeds of the components of the primary and secondary drivelines 16 and 20 are rotating at equal speeds or at speeds that are within the predetermined tolerance.

Figure 3:
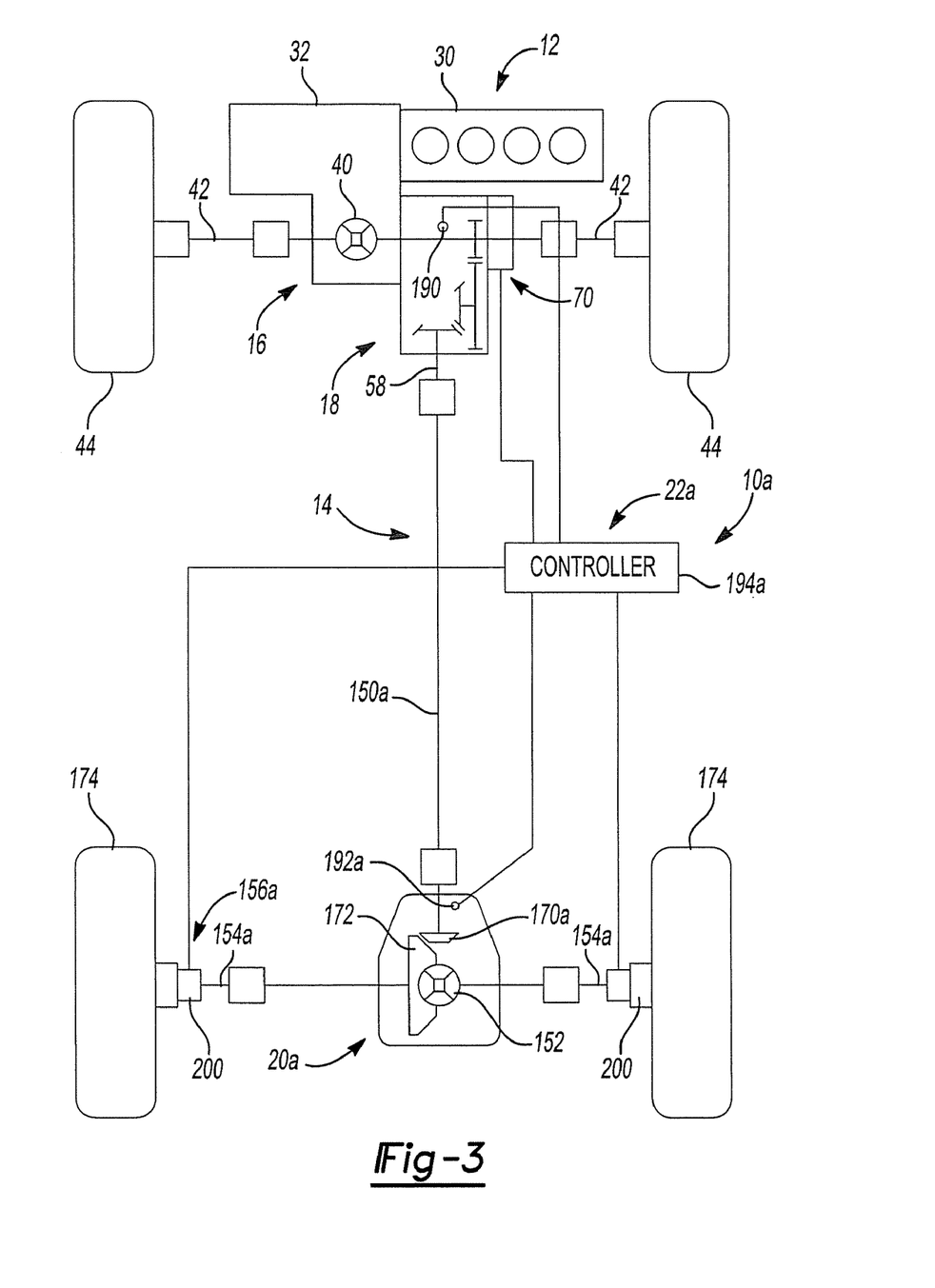
FIG. 3 is a schematic illustration of another vehicle constructed in accordance with the teachings of the present disclosure.

In the example of FIG. 3, the vehicle 10a is generally similar to the vehicle 10 of FIG. 1, except that the at least one torque transfer device 156a includes a pair of automatic wheel hubs 200 that can be operated to selectively couple the second half-shafts 154a to the second set of vehicle wheels 174, the propshaft 150a is coupled directly to the input pinion 170a of the second differential 152, and the second sensor 192a is configured to sense a rotational speed of the input pinion 170a and responsively produce a second sensor signal.

With additional reference to FIG. 2, the vehicle 10a can be normally operated in a two-wheel drive mode (e.g., front wheel drive mode) in which the output 58 of the PTU 18 is de-coupled from the input 52 of the PTU 18 so that substantially all of the rotary power provided from the powertrain 12 is transmitted to the first differential 40. It will be appreciated that when the vehicle 10a is operated in this mode, only the axially movable member 62 of the PTU 18 will be driven by the transmission 32. Moreover, rotation of the second set of vehicle wheels 174 will not cause corresponding rotation of the second differential 152. Consequently, the vehicle 10a will experience only minor losses relative to a conventional two-wheel drive vehicle (not shown) due to the additional mass of the PTU 18 and the secondary driveline 20a, as well as from the rotation of the second half-shafts 154a and the second differential 152.

When all-wheel drive is desired, the control system 22a can be activated via a suitable input, which can include a manual (driver requested) input and/or an input generated by the controller 194a in response to the detection of a predetermined event (e.g., slipping of the first set of vehicle wheels 44). The controller 194a can transmit a signal to the linear actuator 70 to energize the coil 116 to cause the axially movable member 62 to be moved into engagement with the first coupling teeth 94 to thereby rotatably couple the input gear 80 to the input 52 of the PTU 18. The controller 194a can evaluate the first and second sensor signals to determine whether the rotational speed of a component associated with the secondary driveline 20a (i.e., the input pinion 170a in the example provided) is rotating at a speed that is equal to or within a predetermined tolerance of the rotational speed of the component associated with the primary driveline 16 (i.e., the output 54 of the transmission 32 in the example provided). The controller 194 can selectively activate the at least one torque transfer device 156 (i.e., the automatic wheel hubs 200 in the example provided) to transmit rotary power to the second set of vehicle wheels 174 when the rotational speeds of the components of the primary and secondary drivelines 16 and 20a are rotating at equal speeds or at speeds that are within the predetermined tolerance.

Figure 4:
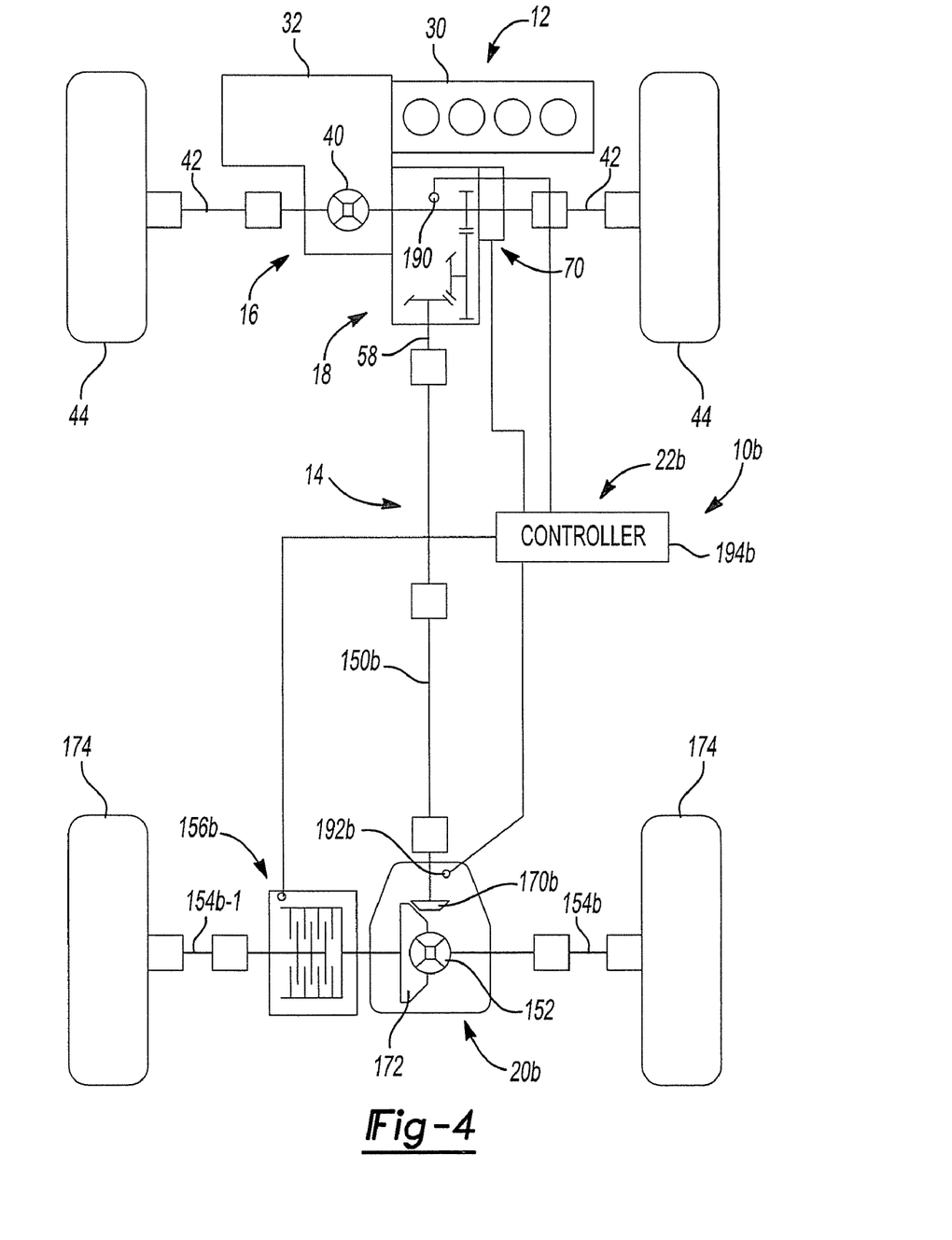
FIG. 4 is a schematic illustration of yet another vehicle constructed in accordance with the teachings of the present disclosure.
Figure 5:
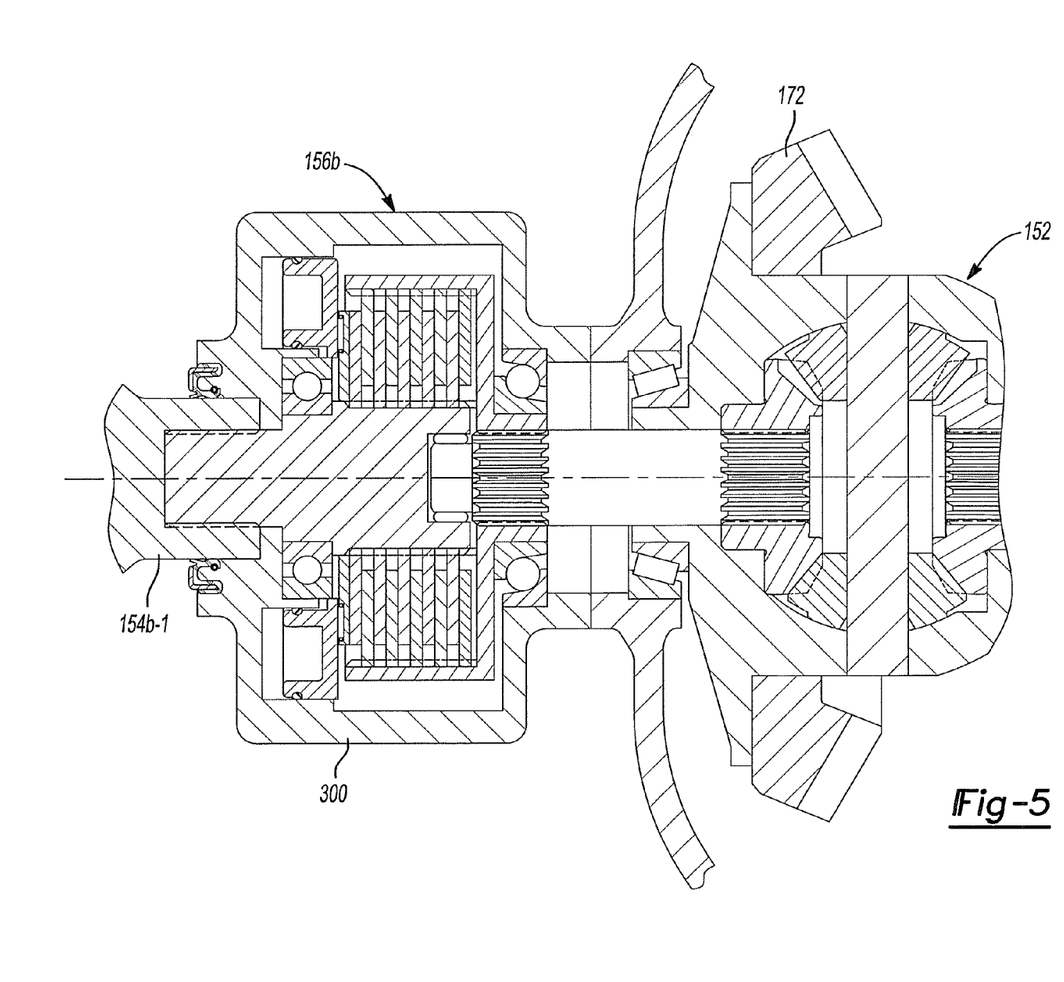
FIG. 5 is a sectional view of a portion of the vehicle of FIG. 4, illustrating a portion of the secondary driveline in more detail.

In the example of FIGS. 4 and 5, the vehicle 10b is generally similar to the vehicle 10 of FIG. 1, except that the at least one torque transfer device 156b includes a friction clutch 300 that can be operated to selectively couple a first one 154b-1 of the second half-shafts 154b to the second differential 152, the propshaft 150b is coupled directly to the input pinion 170b of the second differential 152, and the second sensor 192b is configured to sense a rotational speed of the input pinion 170b and responsively produce a second sensor signal.

With additional reference to FIG. 2, the vehicle 10b can be normally operated in a two-wheel drive mode (e.g., front wheel drive mode) in which the output 58 of the PTU 18 is de-coupled from the input 52 of the PTU 18 so that substantially all of the rotary power provided from the powertrain 12 is transmitted to the first differential 40. It will be appreciated that when the vehicle 10b is operated in this mode, only the axially movable member 62 of the PTU 18 will be driven by the transmission 32. Consequently, the vehicle 10b will experience only minor losses relative to a conventional two-wheel drive vehicle (not shown) due to the additional mass of the PTU 18 and the secondary driveline 20b, as well as from the rotation of the second half-shafts 154b and the second differential 152.

When all-wheel drive is desired, the control system 22b can be activated via a suitable input, which can include a manual (driver requested) input and/or an input generated by the controller 194b in response to the detection of a predetermined event (e.g., slipping of the first set of vehicle wheels 44). The controller 194b can transmit a signal to the linear actuator 70 to energize the coil 116 to cause the axially movable member 62 to be moved into engagement with the first coupling teeth 94 to thereby rotatably couple the input gear 80 to the input 52 of the PTU 18. The controller 194 can evaluate the first and second sensor signals to determine whether the rotational speed of a component associated with the secondary driveline 20 (i.e., the input pinion 170b in the example provided) is rotating at a speed that is equal to or within a predetermined tolerance of the rotational speed of the component associated with the primary driveline 16 (i.e., the output of the transmission 32 in the example provided). The controller 194 can selectively activate the at least one torque transfer device 156 (i.e., the friction clutch 300 in the example provided) to transmit rotary power to the second set of vehicle wheels 174 when the rotational speeds of the components of the primary and secondary drivelines 16 and 20b are rotating at equal speeds or at speeds that are within the predetermined tolerance.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A vehicle comprising:
   a primary driveline having a first differential that is configured to distribute power to a first set of vehicle wheels;

a power take-off unit (PTU) having a PTU input, a PTU output and a synchronizer for selectively de-coupling the PTU output from the PTU input; and a secondary driveline that is configured to distribute power to a second set of vehicle wheels, the secondary driveline having a propshaft, a second differential, a pair of half-shafts and at least one torque transfer device, the propshaft transmitting rotary power between the PTU output and an input of the second differential, the half-shafts being rotatably coupled to an output of the second differential and configured to transmit rotary power to the second set of vehicle wheels, the at least one torque transfer device being configured to selectively inhibit torque transmission through the second differential to the second set of vehicle wheels;

wherein synchronizer includes an axially shiftable member that is movable between a first position, in which the PTU input is not coupled for rotation with an intermediate gear, and a second position in which the PTU input is coupled for rotation with the intermediate gear to thereby transmit drive torque between the PTU input and the PTU output.

2. The vehicle of claim 1, further comprising a control system, the control system including a first sensor, a second sensor and a controller, the first sensor being configured to sense a rotational speed of a component associated with the primary driveline and to responsively generate a first sensor signal in response thereto, the second sensor being configured to sense a rotational speed of a component associated with the secondary driveline and to responsively generate a second sensor signal in response thereto, the controller controlling operation of the at least one torque transfer device based in part on the first and second sensor signals.

3. The vehicle of claim 2, wherein the controller is configured to operate the at least one torque transfer device when a rotational speed of the input of the second differential is equal to a speed of the PTU output when the synchronizer couples the PTU output to the PTU input.

4. The vehicle of claim 2, wherein the controller is configured to operate the at least one torque transfer device when a rotational speed of the propshaft is equal to a speed of the PTU output when the synchronizer couples the PTU output to the PTU input.

5. The vehicle of claim 1, wherein the at least one torque transfer device includes a clutch that couples one of the half-shafts to an output of the second differential.

6. The vehicle of claim 1, wherein the at least one torque transfer device includes a clutch that couples the propshaft to the input of the second differential.

7. The vehicle of claim 1, wherein the at least one torque transfer device includes a pair of wheel disconnecting hubs, each of the wheel disconnecting hubs being coupled to a corresponding one of the half-shafts on a side opposite the second differential, each of the wheel disconnecting hubs being operable in a first mode that is configured to transmit rotary power between the corresponding one of the half-shafts and a corresponding wheel in the second set of wheels, each of the wheel disconnecting hubs being operable in a second mode that is configured to inhibit transmission of rotary power between the corresponding one of the half-shafts and the corresponding wheel in the second set of wheels.

8. The vehicle of claim 1, wherein the synchronizer includes a linear actuator with a shift fork that applies an axially-directed force to the axially shiftable member to cause the axially shiftable member to move from the first position to the second position, the second position to the first position or both.

9. A vehicle comprising:
a primary driveline having a first differential that is configured to distribute power to a first set of vehicle wheels;
a power take-off unit (PTU) having a PTU input, a PTU output, a shift collar, an input gear, a driven gear, a first bevel gear and a second bevel gear, the PTU output being disposed perpendicular to the PTU input, the shift collar non-rotatably but axially-slidably coupled to the PTU input, the input gear being rotatably mounted on the PTU input, the driven gear being non-rotatably coupled to the first bevel gear and meshingly engaged to the input gear, the second bevel gear being coupled for rotation with the PTU output and meshingly engaged to the first bevel gear, the shift collar being movable between a first position, in which the input gear is not coupled for rotation with the PTU input, and a second position in which the input gear is coupled for rotation with the PTU input;
a secondary driveline that is configured to distribute power to a second set of vehicle wheels, the secondary driveline having a propshaft, a second differential, a pair of half-shafts and at least one torque transfer device, the propshaft transmitting rotary power between the PTU output and an input of the second differential, the half-shafts being rotatably coupled to an output of the second differential and configured to transmit rotary power to the second set of vehicle wheels, the at least one torque transfer device being configured to selectively inhibit torque transmission through the second differential to the second set of vehicle wheels; and
a control system, the control system including a first sensor, a second sensor and a controller, the first sensor being configured to sense a rotational speed of a component associated with the primary driveline and to responsively generate a first sensor signal in response thereto, the second sensor being configured to sense a rotational speed of a component associated with the secondary driveline and to responsively generate a second sensor signal in response thereto, the controller controlling operation of the at least one torque transfer device based in part on the first and second sensor signals; and
wherein the PTU further includes a linear actuator, which is coupled to the shift collar, the linear actuator including a shift fork that applies an axially-directed force to the shift collar to cause the shift collar to move from the first position to the second position, the second position to the first position or both, wherein the shift fork is received in a circumferentially extending groove formed about the shift collar.

10. A vehicle comprising:
a first differential that is adapted to be coupled to an output of a powertrain to drive a first set of vehicle wheels on a full-time basis;
a clutched power take-off unit (PTU) having an input member, which co-rotates with a differential case of the first differential, and an output member, the clutched PTU being selectively operable for transmitting rotary power for driving a second set of vehicle wheels; and
at least one torque transfer device coupled to the clutched PTU and configured to selectively decouple the second set of vehicle wheels from the output member of the clutched PTU;

wherein the clutched PTU comprises a collar that is slidable between a first position and a second position, wherein positioning of the collar in the first position inhibits transmission of rotary power between the input and output members and wherein positioning of the collar in the second position permits transmission of rotary power between the input and output members.

11. The vehicle of claim 10, further comprising a control system that includes a first sensor, a second sensor and a controller, the first sensor being configured to sense a rotational speed of a first component that is indicative of a rotational speed of a first wheel of the first set of vehicle wheels and to responsively produce a first sensor signal, the second sensor being configured to sense a rotational speed of a second component that is indicative of a rotational speed of a first wheel of the second set of vehicle wheels and to responsively produce a second sensor signal, the controller being configured to control operation of the clutched PTU based in part on the first and second sensor signals.

12. The vehicle of claim 11, wherein the controller is configured to control the clutched PTU to transmit rotary power from the input member to the output member when the rotational speed of the first and second components are indicative of a situation in which the first wheel of the second set of vehicle wheels is rotating at the speed of the first wheel of the first set of vehicle wheels.

13. The vehicle of claim 11, wherein the controller is configured such that the at least one torque transfer device couples the output member of the clutched PTU to the second set of vehicle wheels prior to the transmission of rotary power from the input member of the clutched PTU to the output member when transitioning from a first mode of operation, in which rotary power is to be provided only to the first set of vehicle wheels, to a second mode of operation in which rotary power is to be provided to both the first and second sets of vehicle wheels.

14. The vehicle of claim 11, wherein the controller is configured such that the at least one torque transfer device decouples the output member of the clutched PTU from the second set of vehicle wheels after the transmission of rotary power from the input member of the clutched PTU to the output member has been interrupted when transitioning from a first mode of operation, in which rotary power is to be provided to both the first and second sets of vehicle wheels, to a second mode of operation in which rotary power is to be provided only to the first set of vehicle wheels.

15. The vehicle of claim 10, further comprising a propshaft that directly couples the output member to an input of the at least one torque transfer device.

16. The vehicle of claim 10, further comprising a second differential and a pair of axle shafts that are disposed between and the second differential and corresponding wheels of the second set of vehicle wheels, and wherein the at least one torque transfer device is configured to selectively couple a first one of the axle shafts to the second differential.

17. The vehicle of claim 16, wherein the at least one torque transfer device is further configured to selectively couple a second one of the axle shafts to the second differential.

18. The vehicle of claim 16, wherein the at least one torque transfer device comprises a friction clutch.

* * * * *